(12) United States Patent
Bravo Montero et al.

(10) Patent No.: US 10,220,470 B2
(45) Date of Patent: Mar. 5, 2019

(54) ON-DEMAND LASER MARKING DEVICE MANUFACTURING METHOD AND LASER MARKING DEVICE OBTAINED BY SAID METHOD

(71) Applicant: MACSA ID, S.A., Manresa (Barcelona) (ES)

(72) Inventors: Francesc Bravo Montero, Manresa (ES); Sven Alexander Vogler, Manresa (ES); Joan Camps Claramunt, Manresa (ES)

(73) Assignee: MACSA ID, S.A., Manresa (Barcelona) (ES)

( * ) Notice: Subject to any disclaimer, the term of this patent is extended or adjusted under 35 U.S.C. 154(b) by 158 days.

(21) Appl. No.: 15/236,237

(22) Filed: Aug. 12, 2016

(65) Prior Publication Data

US 2017/0057007 A1 Mar. 2, 2017

(30) Foreign Application Priority Data

Aug. 28, 2015 (ES) .................................. 201531237

(51) Int. Cl.
| | | |
|---|---|---|
| *B23K 26/00* | (2014.01) | |
| *B41M 5/24* | (2006.01) | |
| *H01S 3/02* | (2006.01) | |
| *B23K 26/064* | (2014.01) | |
| *H01S 3/04* | (2006.01) | |

(52) U.S. Cl.
CPC ........ *B23K 26/0096* (2013.01); *B23K 26/064* (2015.10); *B41M 5/24* (2013.01); *H01S 3/02* (2013.01); *H01S 3/0404* (2013.01)

(58) Field of Classification Search
CPC .................................. B23K 26/00; B41M 5/24
USPC ...................................... 219/121.68; 347/263
See application file for complete search history.

(56) References Cited

U.S. PATENT DOCUMENTS

| | | | | |
|---|---|---|---|---|
| 5,653,900 | A | * | 8/1997 | Clement ............ B23K 26/0838 |
| | | | | 219/121.68 |
| 6,069,752 | A | | 5/2000 | Harrigan et al. |
| 2005/0123011 | A1 | | 6/2005 | Sukhman et al. |
| 2005/0254211 | A1 | | 11/2005 | Su et al. |
| 2009/0245318 | A1 | | 10/2009 | Clifford |

(Continued)

FOREIGN PATENT DOCUMENTS

EP 2214271 A2 8/2010

OTHER PUBLICATIONS

"Not Quite Small Enough to Fit in Your Pocket But at a Price Which You Can Afford, 776MM Nano by Macsa", Mar. 25, 2014, retrieved from the Internet, URL: http://www.codipack.com/wp-content/uploads/2014/03/Nano.pdf.

(Continued)

*Primary Examiner* — Samuel M Heinrich
(74) *Attorney, Agent, or Firm* — Knobbe, Martens, Olson & Bear, LLP

(57) ABSTRACT

Method of producing equipment for marking products by laser, comprising the steps of: having at least one base plate; having various types of modules in which equipment components are grouped; having casings, rear covers and front covers that can be attached to said base plate; selecting modules from each of the different module types; removably attaching the selected modules to the base plate; attaching the casing, rear cover and front cover to the base plate.

15 Claims, 7 Drawing Sheets

(56) References Cited

U.S. PATENT DOCUMENTS

2014/0284608 A1  9/2014 Park et al.
2015/0016481 A1  1/2015 Berger

OTHER PUBLICATIONS

Extended European Search report dated Feb. 13, 2017 in corresponding EP Application No. 16382387.5.
Search Report dated Mar. 17, 2016 in corresponding ES application No. 201531237.

* cited by examiner

ON-DEMAND LASER MARKING DEVICE MANUFACTURING METHOD AND LASER MARKING DEVICE OBTAINED BY SAID METHOD

The present invention relates to the field of equipment for the industrial marking and coding of products by laser.

Equipment for marking products by laser, also known as laser marking equipment, is designed for a specific purpose which determines the characteristics of the components thereof. For example, the most suitable laser technology and the corresponding operating power must be selected depending on the substrate to be marked. Moreover, requirements such as the marking speed of the laser or the quality and size of the marking play an important role when it comes to choosing relevant components such as the optics or the mirror control system.

The known laser marking equipments consist of a single block with the components attached individually to said block, fitted so as to be perfectly adapted to its specific purpose. This means that laser-marking equipments are not very versatile once assembled, as they only operate under optimum conditions in the applications for which they have been produced. Owing to the great variety of laser marking applications, the possible combinations of components in a piece of laser-marking equipment are very great. Consequently, versatility in the production of laser marking equipment is limited due to the heavy dependence on the application for which the equipment is intended.

The low versatility of the known laser-marking equipments means that on-demand production entails a long lead time for the laser-marking equipment. If many orders are received simultaneously, the wait can become unacceptable to the customer. On-demand production requires a sufficient stock of components to be available, which complicates the logistics and makes production more expensive. In addition, if the customer changes the equipment requirements once production has begun, it is often necessary to start production of a new piece of equipment from the beginning.

Furthermore, once the laser marking equipment has been assembled and configured, it is complicated and costly to modify its functionality in order to adapt it to another application. If, for example, the substrate on which the laser marking is to be carried out is replaced, acquiring new equipment that is adapted to this substrate is necessary as components cannot be substituted. Consequently, users of laser-marking equipment have to make a significant investment in order to offer versatility in the event of different marking conditions.

In view of the above, an object of the present invention is to overcome the drawbacks of the known laser marking equipments.

The present invention discloses a method for producing equipment for marking products by laser that comprises the steps of:
 having at least one base plate;
 having various types of modules in which equipment components are grouped, each module comprising a platform to which the components of said module are attached, each platform having means for removable attachment to said base plate, and each module having a common physical data and electricity supply interconnection interface for the components of the module;
 having casings, rear covers and front covers that can be attached to said base plate;
 selecting modules from each of the different module types for correct operation of the equipment according to its future application;
 removably attaching the selected modules to the base plate;
 attaching the casing, rear cover and front cover to the base plate.

Both the attachment of the components to the platforms of the modules and attachment of the modules to the base plate are carried out using positioners of any type.

Preferably, the step of selecting modules from each of the different module types comprises the steps of:
 selecting a control module;
 selecting a laser beam generation module;
 selecting an electricity supply module;
 selecting an optics module.

Preferably, the step of selecting modules from each of the different module types further comprises selecting an interconnection module for the interconnection of data and electricity supply between the remaining modules.

Optionally, the step of removably attaching the selected modules to the base plate comprises the following steps:
 attaching the control module, the laser beam generation module and the electricity supply module to a base plate that comprises an area of grooves in the base plate as positioners, said modules being attached to the grooves by means of removable attachment means;
 attaching an optics module to a smooth area of the base plate with any type of positioner using removable attachment means.

Preferably, the step of removably attaching the selected modules to the base plate comprises the step of attaching an interconnection module for the interconnection of data and electricity supply between the remaining modules.

The method of producing equipment for marking products by laser according to the present invention is based on the provision of various types of modules, each module including various components of the equipment. Before receiving the order from the customer, the components are grouped into different functional modules. Once the order arrives, the module that is most suited to the needs of the user must be chosen from among each module type and, if applicable, so too must the base plate to which said selected modules are to be attached. Next, the selected modules are removably attached to the base plate and the casing and the rear and front covers are attached.

Both the base plate and the platforms of the modules have positioners that allow removable attachments to be made. The positioners may be of any type, such as holes or grooves in the base plate, for example.

The production method according to the present invention makes stock-oriented production possible, and different types of modules can be stocked that have been prepared for quick-fitting to the equipment base plate once an order has been received. The base plate may be the universal element for all the equipment, and, starting from said base plate, the other modules are fitted according to the order. The present invention therefore allows both the inventory and order production times to be reduced.

Production of the equipment is therefore very fast and versatile. For example, if the characteristics of the piece of equipment need to be modified in order to adapt it to a new application, the modules that are no longer suitable simply need to be replaced by others comprising components that are more appropriate to the new application. The removable attachments allow said replacements to be easily carried out. Said replacements may be performed with ease should the customer change the requirements during the production process. For example, if the customer changes the marking speed, only the optics module need to be removed and replaced by an optics module with suitable components, without the need to replace the rest of the equipment modules.

Furthermore, instead of attaching each component individually to the base, modules that group sets of components are attached, and production therefore takes place much more quickly, the 'picking' process is simplified and the lead time is considerably reduced.

The production method according to the present invention means that tailoring the equipment in order to adjust it to the needs of the customer is inexpensive and simple. These features make it possible to produce "made-to-measure" equipment for each customer.

The present invention also discloses equipment for marking products by laser obtained by the method of the present invention, in other words, equipment that comprises a base plate on which components of the equipment are arranged, an outer casing, a rear cover and a front cover being attached to the base plate, characterised in that the different components are grouped in modules, each module comprising a platform to which the components of said module are attached, each platform having means for removable attachment to the base plate, and each module having a common physical interface for data and electricity supply interconnection for the components of the module.

The components that are grouped in modules communicate with each other and receive an electricity supply through a physical interface available to each module. The components of a module share an interface. This feature greatly simplifies the establishment of the connections between the various components of the laser equipment and helps reduce the production time.

Preferably, the equipment comprises:
a control module;
a laser beam generation module;
an electricity supply module;
an optics module.

Optionally, the equipment also comprises an interconnection module for the electrical and data interconnection between the remaining modules. This module improves the module interconnection process and rationalises the layout of the connection cables.

Optionally, the base plate has any type of positioner for the removable attachment of the modules.

In an embodiment of the present invention, the base plate comprises, as positioners, an area with grooves and a smooth area with holes, both means being intended for the attachment of the modules to the base plate.

Preferably, the control module, the electricity supply module, the laser beam generation module and the interconnection module are removably attached to the grooves in the base plate and the optics module is removably attached to the holes in the smooth area of the base plate.

Optionally, the optics module comprises, in turn, any type of positioner for the removable attachment of the optical components to the platform thereof. Also optionally, said positioners of the optics module are grooves for the removable attachment of the optical components.

The versatility offered by each module for the attachment of its components allows said module to be positioned and removed quickly and easily. Thus, should any component of a module fail, there is no need to replace the entire module, but instead only the necessary component need be replaced.

Optionally, said means for the removable attachment of each platform to the base and said means for the removable attachment of the optical components to the platform of the optics module both comprise a nut that receives a bolt, said nut being inserted in the groove and said bolt being slidable along the groove.

Preferably, a projection on each platform is fitted in a groove in the base so that the platform remains attached to the groove.

Said removable attachment options allow the modules or components to be installed and removed easily and quickly.

For a better understanding, the accompanying drawings of an embodiment of the laser marking equipment according to the present invention are given as an explanatory yet non-limiting example.

Thanks to the production method according to the present invention different types of modules and base plates are available before beginning production of the equipment for marking products by laser. Each of the module types is designed for a particular function, such as for example the optics module, which is intended to adjust the laser beam for marking. To perform its function, each module type comprises components related to its function, using the optics module as an example once again, which comprises the scanner, beam expanders, mirrors and the system that moves said components, among others.

The customer informs the manufacturer of the equipment requirements, for example, by means of a software application where the customer answers questions aimed at determining the characteristics the equipment will require for its future industrial application. Depending on the data provided by the customer, suitable modules are selected and, if applicable, the base plate in order to be able to begin production.

Figure 1:
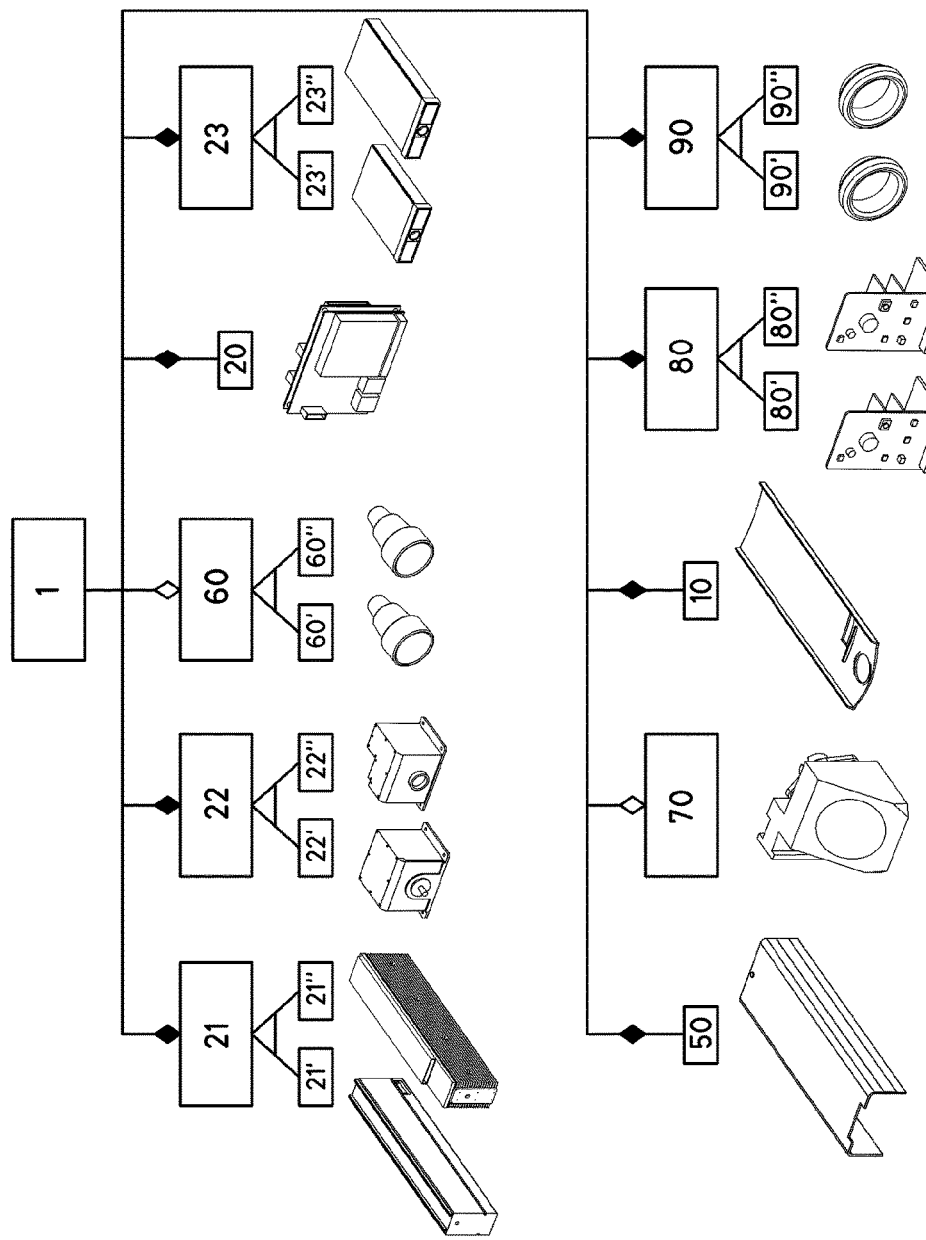
FIG. 1 is a diagram of all the essential and optional components for the production of an embodiment of the laser marking equipment according to the present invention.

In the embodiment shown in FIG. 1, the diagram shows modules and components that make up the laser equipment. The boxes in the diagram showing a solid rhombus in the upper portion are components or modules that are essential for the production of the equipment. In contrast, the boxes showing an empty rhombus represent extra components that can be added to the equipment but are not essential for its operation, such as for example, the beam expanders -60- or the beam pointer -70-. In this embodiment a base plate -10- and its corresponding casing -50- have already been selected.

Apart from the extra components in the previous paragraph, in the case of FIG. 1 laser modules -21- with two different options -21'-, -21"-, optics modules -22- also with two different options -22'-, -22"-, a control module -20-, electricity supply modules -23-, with two options -23'-, -23"- shown, and interconnection modules -80-, also with two options -80'-, -80"- shown, are available in stock. Each option has different characteristics and/or components. For example, the electricity supply modules may be designed for different powers. Finally, there is also a lens -90-, which has two options -90'-, -90"-. It should be mentioned that the front and rear covers of the equipment have not been shown in FIG. 1, but appear in the exploded illustration in FIG. 2 with the reference numerals -101- and -102-.

Once the modules and components that are to be attached to the base plate -10- have been chosen, said modules and components are attached by removable attachment means. In the embodiment in FIG. 2, the base plate -10- has positioners in the form of holes -13- for attaching the different modules by bolts. The laser in FIG. 2 was produced from the inventory of components and modules shown in FIG. 1. Having previously chosen the base plate -10- and corresponding casing -50-, the rest of the elements were chosen according to the technical requirements of the customer. In this case, the laser module -21'-, the electricity supply module -23'-, the optics module -22'-, the lens -90"- and the interconnection module -80"- were chosen. The rest of the modules and components do not have more than one option in FIG. 1.

Figure 2:
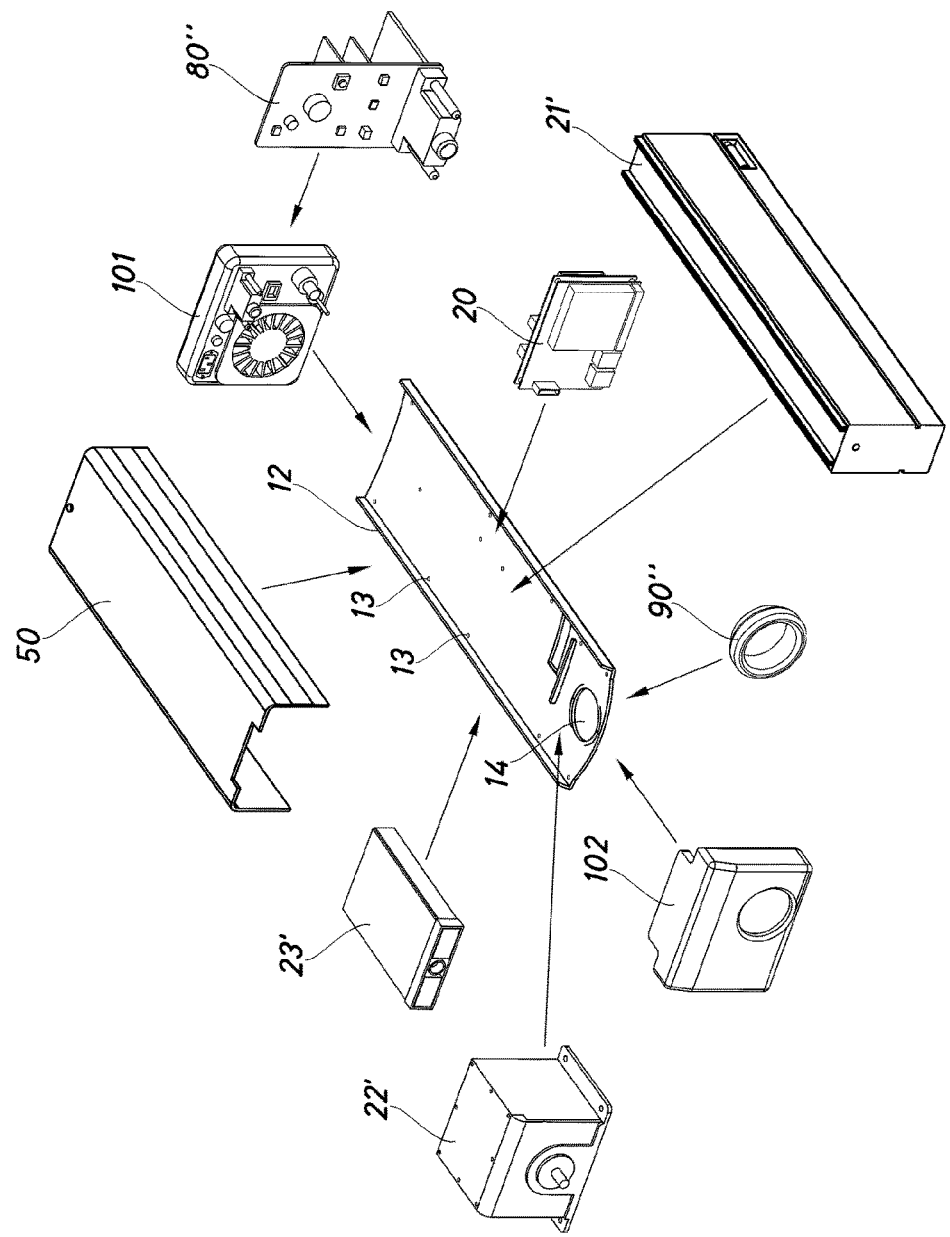
FIG. 2 is an exploded view of a selection of the components and modules shown in the embodiment of FIG. 1.

All the elements in FIG. 2 are removably attached to the base plate -10- apart from the interconnection module -80"-, which is connected to the rear cover -101- initially. If the industrial application of the apparatus is changed, only the modules that are no longer suitable need be replaced. Furthermore, production time is very short and the complexity of the process is low.

Once all the elements have been placed on the base plate -10-, the rear cover -101-, the front cover -102- and the casing -50- are positioned. At this point production of the equipment is complete and it is now ready for delivery. The cover and casing may be selected for reasons of external design and/or because of IP protection level requirements. In all cases, the covers selected are attached to the same base.

In the equipment shown, the base plate -10- always has an aperture -14- at one end thereof, specifically at the end used as the outlet of the laser beam, regardless of the arrangement of the laser beam outlet (front or lower).

The platform to which the components of each module are attached can be understood as an external structure that provides support to the components. The platform is not necessarily a lower flat base of a module, as in the case of the embodiment in FIGS. 3 to 7 described next.

Figure 3:
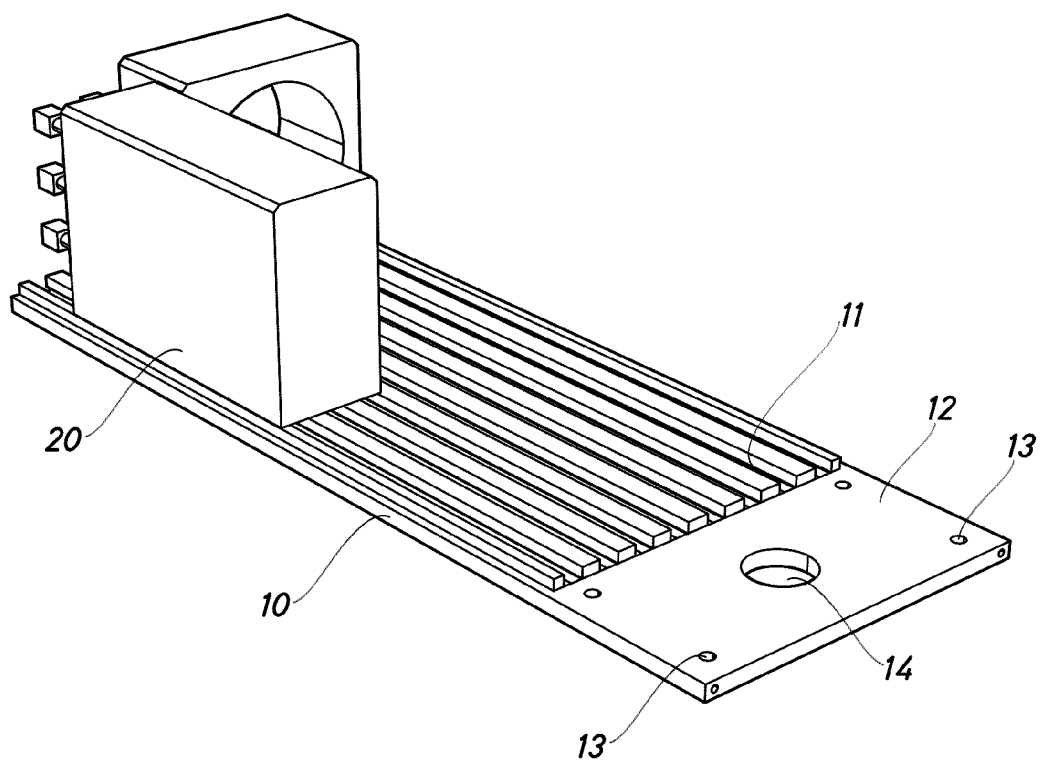
FIG. 3 is a perspective view of a second preferred embodiment of the base plate of the equipment for marking products by laser according to the present invention, with a single module fitted.

As shown in the embodiment in FIG. 3, the equipment for marking products by laser according to the present invention is assembled starting with a base plate -10- which has two types of positioners. On one side there is an area with grooves -11- and, on the other side, a smooth area -12- at the end through which the laser beam exits. The different components of the equipment are attached to the area with grooves -11- in a manner grouped in modules, as in the case of the control module -20-, which is already attached to the base plate -10-.

All the modules are shown schematically in the embodiment in FIGS. 3 to 7 for reasons of clarity. Moreover, also for reasons of clarity, the control module -20- is shown in FIG. 3 without the means for connection to the base plate -10-.

Figure 4:
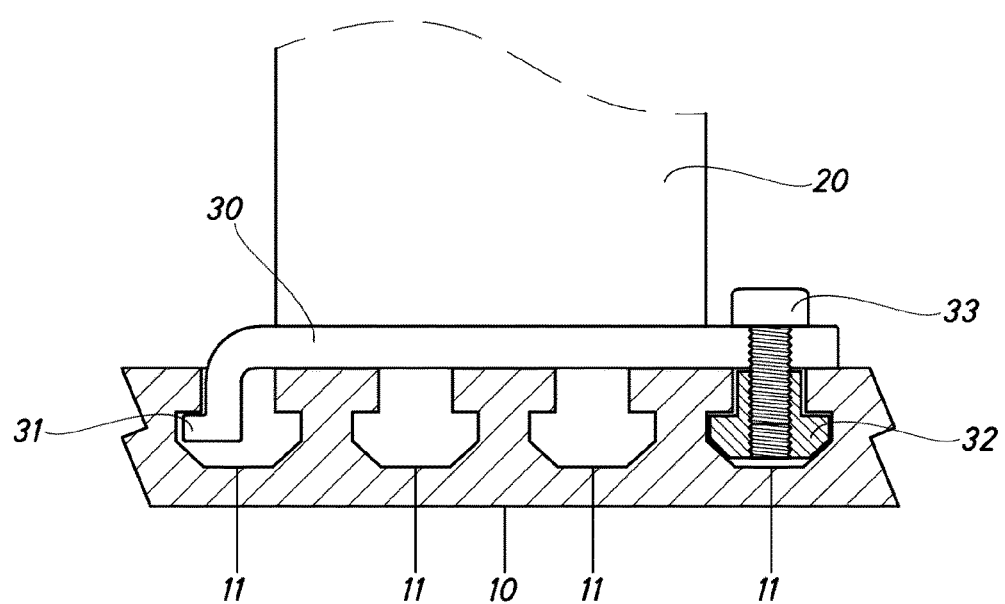
FIG. 4 shows a detail of the attachment between a module and the grooves in the base plate of FIG. 3.

FIG. 4 shows a detail of the attachment of the control module -20- to the base plate -10-. The platform -30- on which the components of the module are attached has means for removable attachment to the base plate -10-. The platform -30- comprises, at one end, a projection -31- which is fitted in a groove -11- and, at the other end, a nut -32- inserted in another groove -11- which receives a bolt -33-. The bolt -33- passes through a hole -34- in the platform -30- (see FIG. 5) such that the platform -30- is attached to the grooves -11- in the base plate -10-. The positioners shown in this embodiment illustrate one attachment option; the platform may be provided with bolted attachments at both ends thereof or may comprise other types of positioners which provide removable attachment means.

The components of the equipment are grouped in modules, which are attached to the base plate -10-. The attachment of the laser beam generator module -21- can be seen in FIG. 5, in which it is possible to see the holes -34- in the platform -30- through which pass the bolts -33- that are attached to the nuts -32- inserted in the grooves -11-. The nuts -32- can slide inside the grooves -11- and can be removed from the grooves -11- so that the position in which the modules are attached can be modified.

Figure 5:
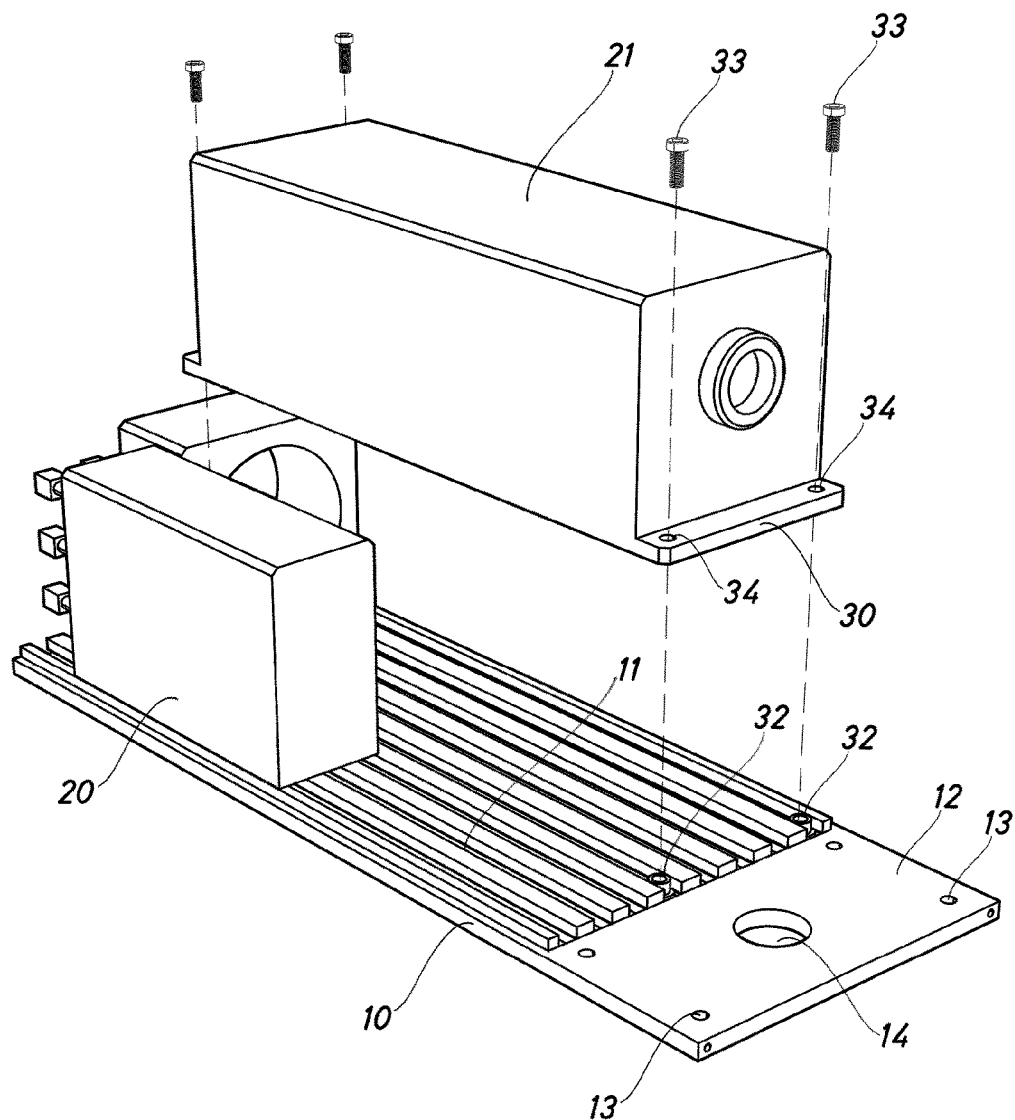
FIG. 5 is a perspective view of the connection of a module, shown schematically, to the base plate of the equipment of FIG. 3.
Figure 6:
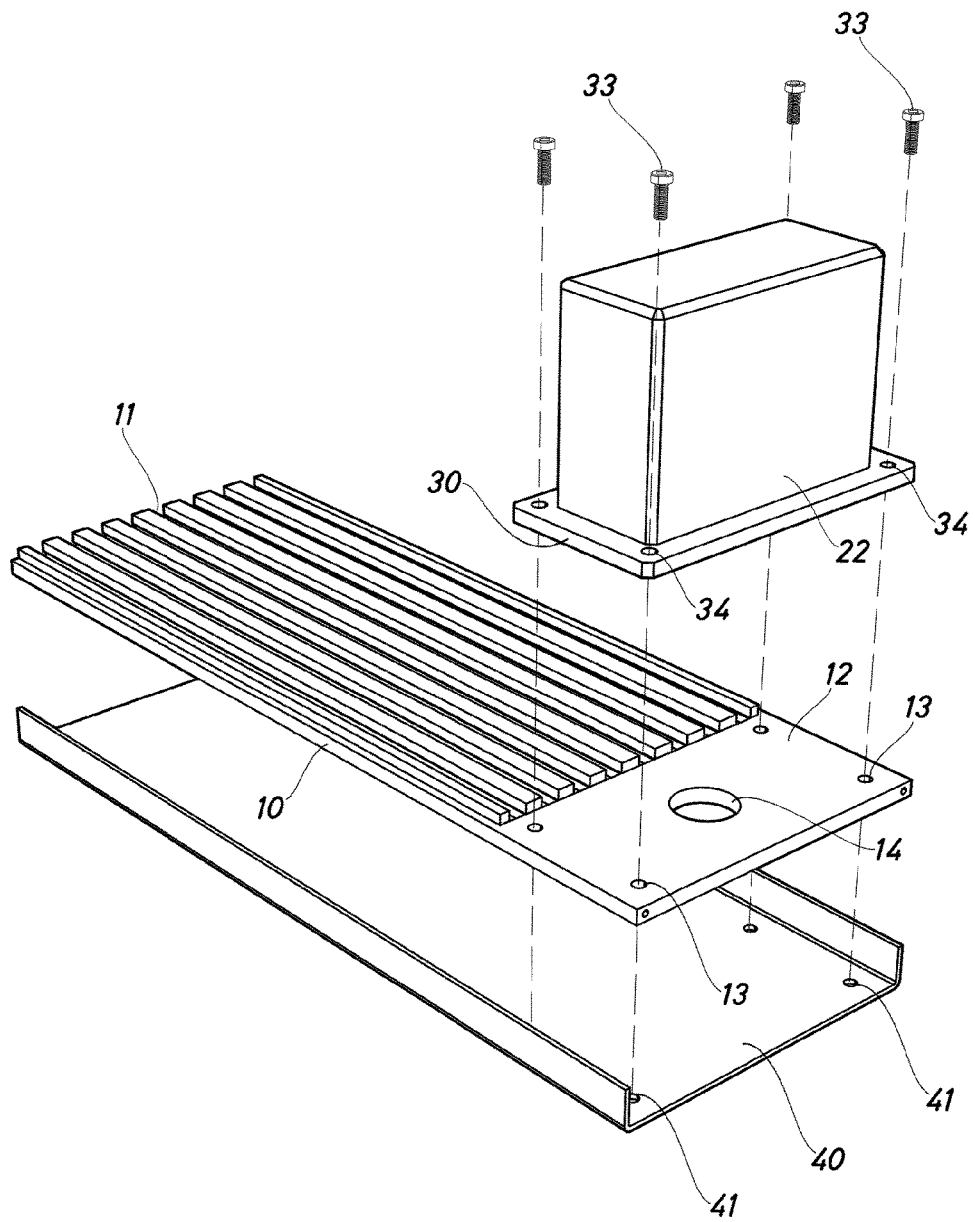
FIG. 6 is a perspective view of the attachment of the optics module to the smooth area of the base plate of the equipment of FIG. 3.

For reasons of clarity, the control module -20- is shown schematically in FIG. 5, being shown in said figure without its platform and without its attachment means.

The optics module -22- (see FIG. 6) is attached to the smooth area -12- of the base plate -10- instead of to the portion with grooves -11-. The optics module -22- (see FIG. 6) can be attached by bolting using the bolts -33- that pass through the holes -34- in the platform -30- and are screwed into the holes -13- in the base plate -10-. Optionally, the bolts -33- may also be screwed into the lower cover -40- of the laser marking equipment through the holes -41- therein.

The optics module comprises the scanner, which is responsible for directing the laser, together with the corresponding physical attachment interfaces for electricity supply and data. The optics module may also comprise the output lens and optional elements such as beam directors, concentrators, etc. Said elements may arrive at the assembly stage (lens and optional elements) together with the module or alternatively may be attached thereto during assembly.

The platform of the optics module -22- comprises any type of positioners on the face to which the components thereof are attached (not shown). Said positioners provide the various components with means for removable attachment to the platform of the module. Ultimately, the optics module itself performs the function of base plate for its own components.

Figure 7:
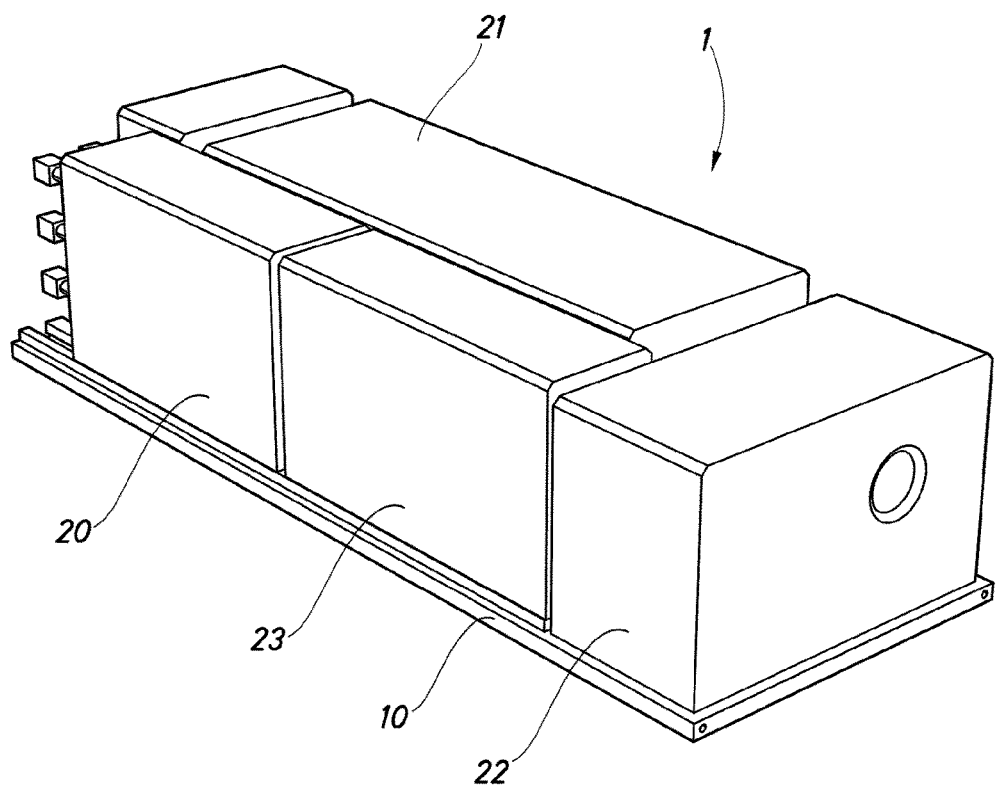
FIG. 7 is a perspective view of the equipment for marking products by laser of the embodiment of FIG. 3, with all the modules fitted.

Once all the modules have been attached to the base plate -10-, as seen in FIG. 7, the laser equipment -1- is ready to receive the casing and covers as shown in FIG. 2 (not shown in FIG. 7). The completed equipment -1- of this embodiment comprises the control module -20-, the laser beam generation module -21-, the optics module -22- and the power module -23-.

Although the invention has been presented and described with reference to embodiments thereof, it will be understood that these do not limit the invention, and therefore multiple structural or other details that may be obvious to persons skilled in the art after interpreting the subject matter disclosed in the present description, claims and drawings may vary. Therefore all variants and equivalents will be included within the scope of the present invention if they can be considered to fall within the widest scope of the following claims.

The invention claimed is:

1. Method for producing equipment for marking products by laser which consists of a single block with the components attached to said block, said method comprising the steps of:
    having at least one base plate;
    having various types of modules with different options in which equipment components are grouped, each module comprising a platform to which the components of said module are attached, each platform having means for removable attachment to said base plate, and each module having a common physical data and electricity supply interconnection interface for the components of the module;
    having casings, rear covers and front covers that can be attached to said base plate;
    selecting modules from each of the different module types for correct operation of the equipment according to its future application;
    removably attaching the selected modules to the base plate;
    attaching the casing, rear cover and front cover to the base plate.

2. Production method according to claim 1, characterised in that the step of selecting modules from each of the different module types comprises the steps of:
    selecting a control module;
    selecting a laser beam generation module;
    selecting an electricity supply module;
    selecting an optics module.

3. Production method according to claim 2, characterised in that the step of selecting modules from each of the different module types further comprises selecting an interconnection module for the interconnection of data and electricity supply between the remaining modules.

4. Production method according to claim 3, characterised in that the step of removably attaching the selected modules to the base plate comprises the following steps:
    attaching the control module, the laser beam generation module and the electricity supply module to a base plate that comprises an area of grooves as positioners, said modules being attached to the grooves by removable attachment means;
    attaching an optics module to a smooth area of the base plate with any type of positioner using removable attachment means.

5. Production method according to claim 4, characterised in that the step of removably attaching the selected modules to the base plate comprises the step of attaching an interconnection module for the interconnection of data and electricity supply between the remaining modules.

6. Equipment for marking products by laser obtained by means of the method of claim 1, said equipment comprising a base plate on which components of the equipment are arranged, an outer casing, a rear cover and a front cover being attached to the base plate, characterised in that the various components are grouped in modules, each module comprising a platform to which the components of said module are attached, each platform having means for removable attachment to the base plate, and each module having a common physical data and electricity supply interconnection interface for the components of the module.

7. Equipment according to claim 6, characterised in that it comprises:
    a control module;
    a laser beam generation module;
    an electricity supply module;
    an optics module.

8. Equipment according to claim 7, characterised in that it further comprises an interconnection module for the interconnection of data and electricity supply between the remaining modules.

9. Equipment according to claim 8, characterised in that the base plate has positioners of any type for the removable attachment of the modules.

10. Equipment according to claim 9, characterised in that the base plate comprises, as positioners, an area with grooves and a smooth area with holes, both means intended for the attachment of the modules to the base plate.

11. Equipment according to claim 10, characterised in that the control module, the electricity supply module, the laser beam generation module and the interconnection module are removably attached to the grooves in the base plate and the optics module is removably attached to the holes in the smooth area of the base plate.

12. Equipment according to claim 11, characterised in that the optics module comprises, in turn, positioners of any type for the removable attachment of the optical components to its platform.

13. Equipment according to claim 12, characterised in that said positioners of the optics module are grooves for the removable attachment of the optical components.

14. Equipment according to claim 13, characterised in that said means for the removable attachment of each platform to the base plate and said means for the removable attachment of the optical components to the platform of the optics module both comprise a nut that receives a bolt, said nut being inserted in the groove and said nut being able to slide along the groove.

15. Equipment according to claim 14, characterised in that a projection on each platform is fitted inside a groove in the base plate so that the platform remains attached to the groove.

* * * * *

UNITED STATES PATENT AND TRADEMARK OFFICE
CERTIFICATE OF CORRECTION

| | |
|---|---|
| PATENT NO. | : 10,220,470 B2 |
| APPLICATION NO. | : 15/236237 |
| DATED | : March 5, 2019 |
| INVENTOR(S) | : Francesc Bravo Montero et al. |

It is certified that error appears in the above-identified patent and that said Letters Patent is hereby corrected as shown below:

On the Title Page

Item (30), Line 2, in the Foreign Application Priority Data change "201531237" to --P 201531237--.

Signed and Sealed this
Twenty-fifth Day of June, 2019

Andrei Iancu
*Director of the United States Patent and Trademark Office*